United States Patent
Amada

[11] Patent Number: 5,952,649
[45] Date of Patent: Sep. 14, 1999

[54] OPTICAL WRITE APPARATUS WITH AN OPERATION FOR EVEN CHARGING OF PHOTOSENSITIVE ELEMENT

[75] Inventor: Taku Amada, Kanagawa, Japan

[73] Assignee: Ricoh Company, Ltd., Tokyo, Japan

[21] Appl. No.: 08/907,617

[22] Filed: Aug. 8, 1997

[30] Foreign Application Priority Data

Aug. 19, 1996 [JP] Japan .................................... 8-217209

[51] Int. Cl.⁶ .................................. H01J 5/16; G02F 1/01
[52] U.S. Cl. ........................ 250/234; 250/235; 250/216; 250/225; 359/216
[58] Field of Search ................................ 250/216, 225, 250/234–236; 359/216–219, 198, 196

[56] References Cited

U.S. PATENT DOCUMENTS

| | | | |
|---|---|---|---|
| 4,800,270 | 1/1989 | Blais | 250/235 |
| 4,992,655 | 2/1991 | Shelander | 250/235 |
| 5,671,081 | 9/1997 | Hisa | 359/216 |

FOREIGN PATENT DOCUMENTS

| | | |
|---|---|---|
| 63-316821 | 12/1988 | Japan . |
| 2-29614 | 1/1990 | Japan . |
| 5-164983 | 6/1993 | Japan . |

*Primary Examiner*—Stephone B. Allen
*Attorney, Agent, or Firm*—Oblon, Spivak, McClelland, Maier & Neustadt, P.C.

[57] ABSTRACT

An optical write apparatus includes a light source unit, a first image-forming optic, a beam deflector, a transparent plate, a second image-forming optic, and a photosensitive body, the transparent plate being provided at a predetermined angle α with respect to a main-scanning direction on a scanned surface so that charge is built up evenly on the scanned surface.

36 Claims, 5 Drawing Sheets

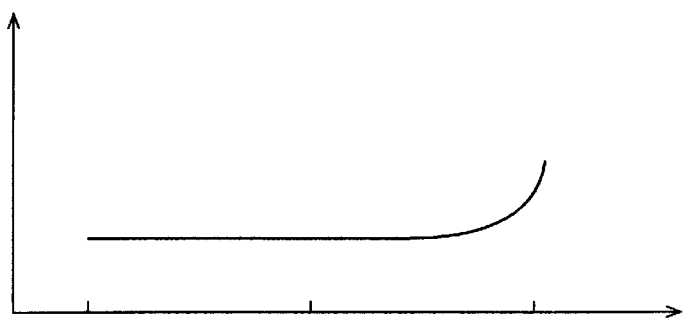
FIG.5A
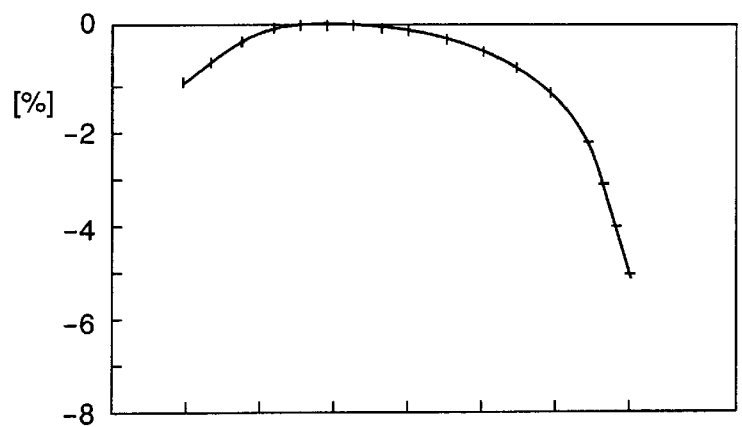
FIG.5B
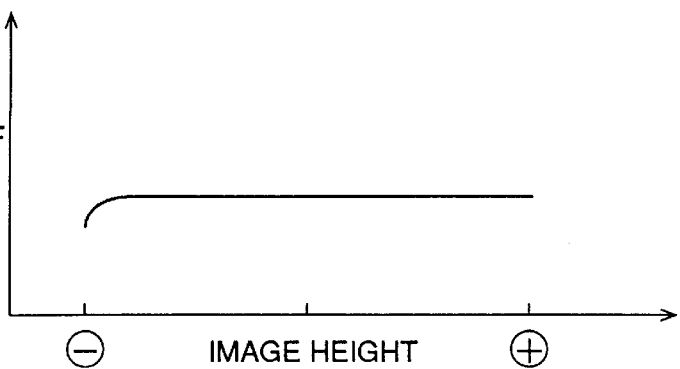
FIG.5C AMOUNT OF CHARGE
IMAGE HEIGHT // OPTICAL WRITE APPARATUS WITH AN OPERATION FOR EVEN CHARGING OF PHOTOSENSITIVE ELEMENT

BACKGROUND OF THE INVENTION

1. Field of the Invention

The present invention generally relates to optical write apparatuses and, more particularly, to an optical write apparatus for use in a printer, a digital copier or a laser facsimile machine and applicable to a measuring instrument and a display using laser beam scanning.

2. Description of the Related Art

In laser printers, digital copiers, laser facsimile machines and the like, there is used an optical write system for forming an image by scanning a photosensitive body with a laser beam emitted by a semiconductor laser or the like and deflected by a beam deflector such as a polygon mirror. For example, Japanese Laid-Open Patent Application No. 2-29614 discloses such an optical write apparatus.

The optical write apparatus disclosed in Japanese Laid-Open Patent Application No. 2-29614 is a two-beam optical write apparatus. In this two-beam optical write apparatus, two polarized laser beams having respective planes of polarization at right angles to each other are combined using a deflecting beam splitter. The two beams exiting the deflecting beam splitter are then transformed into beams circularly polarized in opposite directions by passing through a quarter-wave plate. The circularly polarized beams are deflected by a beam deflector embodied by a polygon mirror so as to scan a scanned surface. Due to circular polarization, the two beams have identical polarizations at the deflecting surface of the beam deflector even if they differ in the vector rotation direction. Therefore, the beam deflector reflects the two beams with substantially the same reflectivity so that the entire optical system may have substantially uniform transmittivity with respect to the beams.

Generally, a photosensitive body of a write optical apparatus has uneven photosensitivity. For reasons derived from the production process, unevenness usually occurs at the ends of the photosensitive body in the scanning direction. A background for this unevenness will be discussed.

A photosensitive (OPC) drum is usually produced using a so-called dipping process. FIGS. 1A–1C are schematic diagrams showing the dipping process. As shown in FIG. 1A, a drum 11 is dipped in a solution 27 of a photosensitive material (OPC) filling a container such that a rotation axis of the drum 11 is parallel with the longitudinal axis of the container. As shown in FIG. 1B, a photosensitive film is formed on the drum 11 by raising the drum 11 from the solution 27. As indicated by a curve 28 of FIG. 1B, the resultant photosensitive drum 11 produced by the dipping process is uneven in thickness of the photosensitive film. More specifically, after the drum 11 is raised from the solution 27, the solution 27 is drawn toward the lower end of the drum 11 due to gravity action, resulting in a relatively small film thickness toward the higher end of the drum 11 and a relatively large film thickness toward the lower end thereof.

In the presence of unevenness in thickness of the photosensitive film on the drum 11, uneven photosensitivity distribution on the drum 11 results. As indicated by a curve 29 of FIG. 1C, photosensitivity on the drum 11 is relatively low toward the higher end of the drum 11 where the photosensitive film is relatively thin, and is relatively high toward the lower end of the drum 11 where the photosensitive film is relatively thick.

Photosensitivity of the surface of the drum 11, exposure of the surface of the drum 11 to a laser beam (light intensity of the laser beam) and the amount of charge built up on the surface of the photosensitive drum 11 are generally bound in a relationship

[photosensitivity]×[exposure (light intensity)] [amount of charge]

Assuming that the light intensity of the laser beam scanning the photosensitive body remains unchanged over the scanning range, uneven photosensitivity distribution on the drum 11 results in a relatively large amount of charge built up in a portion with high photosensitivity and a relatively small amount of charge built up in a portion with low photosensitivity.

As a result, there is produced unevenness in image density. One approach to avoid the unevenness is to fit a charger for uniformly charging the surface of the photosensitive drum 11 at an angle with respect to the rotation shaft of the photosensitive drum 11 so that the charger has varying gaps with respect to the surface of the photosensitive drum 11 depending on the level of photosensitivity on the surface of the photosensitive drum 11. In addition, the gaps could be adjusted so as to ensure that charge is built up evenly on the surface of the photosensitive drum 11.

Usually, a motor is used to drive a beam deflector embodied by a polygon mirror. A problem presented by noise produced by the motor is generally resolved by accommodating the beam deflector in a housing. The portion of such a housing where the laser beam passes should be formed of a transparent member in order to ensure a desired level of light intensity. The light intensity of the beam on the photosensitive drum 11 varies significantly depending on the angle of incidence of the laser beam on the transparent member. As a result, even when it is assumed that the photosensitive drum 11 has an even photosensitivity distribution, the amount of charge built up on the photosensitive drum 11 is not even.

SUMMARY OF THE INVENTION

Accordingly, an object of the present invention is to provide an optical write apparatus in which the aforementioned problems are eliminated.

Another and more specific object of the present invention is to provide an optical write apparatus in which variation, in a scanning direction, in the light intensity of a laser beam scanning a photosensitive body is controlled so that charge is built up on the photosensitive body evenly in the scanning direction.

Still another object of the present invention is to provide an optical write apparatus in which a beam deflector is accommodated in a housing to muffle noise produced by driving the beam deflector, and in which charge is built up on a photosensitive body evenly in a scanning direction by forming a portion of the housing, located on the optical path of the incident beam and the exit beam, of a transparent member and by adjusting the angle of the transparent member.

The aforementioned objects can be achieved by an optical write apparatus including a light source unit, a first image-forming optic, a beam deflector, a transparent plate, a second image-forming optic, and a photosensitive body, the transparent plate being provided at a predetermined angle α with respect to a main-scanning direction on a scanned surface so that charge is built up evenly on the scanned surface.

BRIEF DESCRIPTION OF THE DRAWINGS

Other objects and further features of the present invention will be apparent from the following detailed description when read in conjunction with the accompanying drawings, in which:

FIG. 5A is a graph showing an example of photosensitivity distribution on a photosensitive drum;

FIG. 5B is a graph showing an example of shading characteristic of a transparent member;

FIG. 5C is a graph showing an example of charge distribution that occurs when the photosensitivity distribution of FIG. 5A and the shading characteristic of FIG. 5B concur;

DESCRIPTION OF THE PREFERRED EMBODIMENTS

Figure 2:
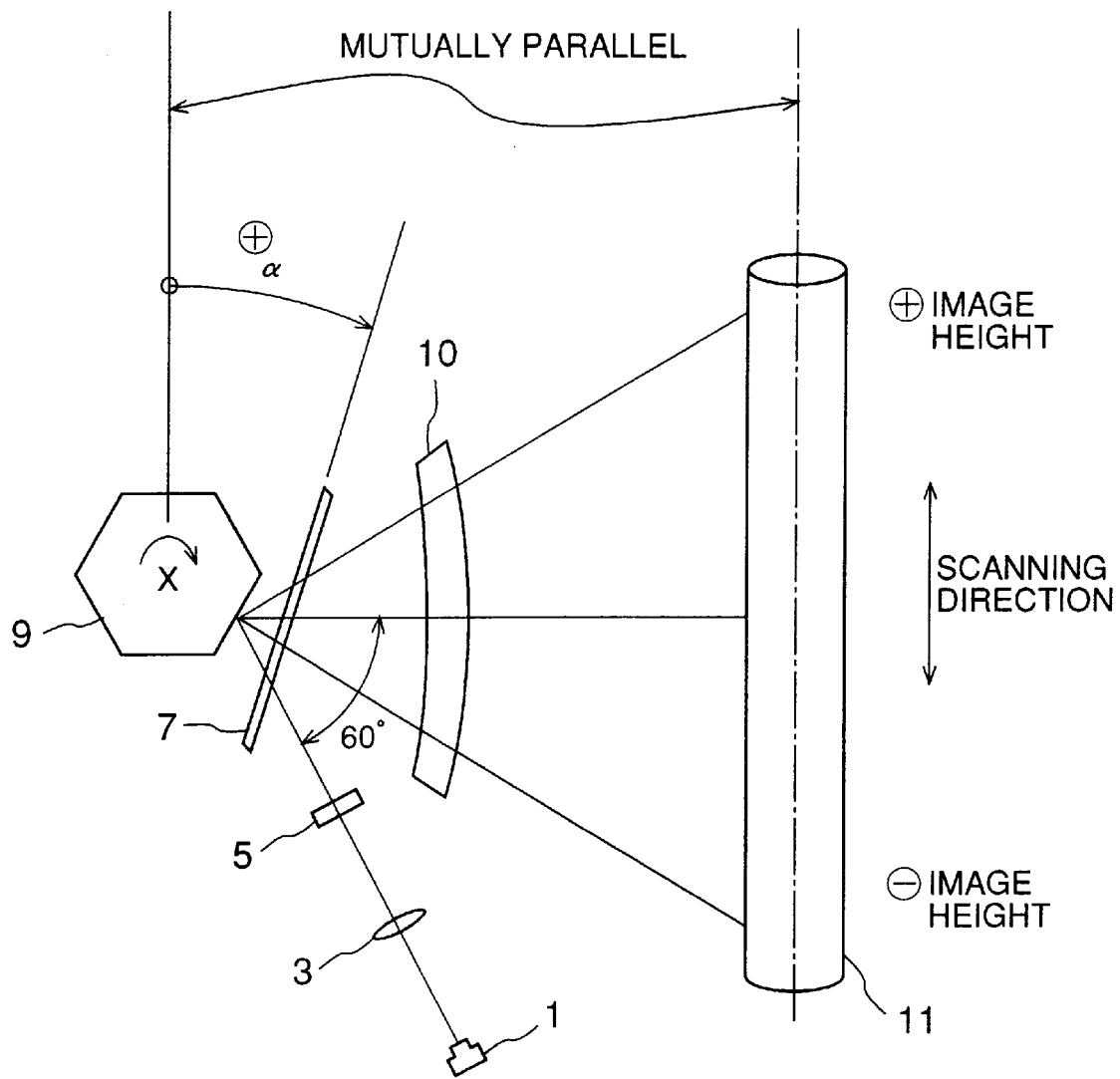
FIG. 2 shows an optical write apparatus according to the present invention.

FIG. 2 shows an optical write apparatus in which a laser beam emitted by a semiconductor laser 1 is deflected by a beam deflector 9 embodied by a polygon mirror so as to scan the photosensitive drum 11. Referring to FIG. 2, the laser beam emitted by the semiconductor laser 1 is converged by an image-forming optic 3. The beam exiting the image-forming optic 3 has a plane of polarization at right angles to or parallel with a plane swept by the beam in the main-scanning direction. By passing through a polarizer 5, the beam is transformed into a circularly polarized beam. Alternatively, the polarizer 5 transforms the beam into a beam having the plane of linear polarization rotated approximately −45° or +45° around the optical axis.

A transparent member 7 is provided between the polarizer 5 and the beam deflector 9 so as to be close to the latter. The transparent member 7 is made of a substantially transparent material such as a monolithic soundproof glass plate and is provided to encompass the optical path of the incident beam and the exit beam for the beam deflector 9. The laser beam transmitted through the transparent member 7 and incident on the beam deflector 9 is deflected as the beam deflector 9 is being rotated. The deflected beam exits the beam deflector 9 via the transparent member 7 and arrives at the photosensitive drum 11 via a scanning optic formed of an fθ lens 10 so as to scan the surface of the photosensitive drum 11 in the axial direction thereof.

In the example of FIG. 2, the incident beam for the beam deflector 9 forms a 60° angle with the perpendicular bisector of the length of the photosensitive body. The beam deflector 9 and a motor for driving the same are accommodated in a housing or the like (not shown) so that the noise produced by the beam deflector 9 and the motor is muffled. The transparent member 7 constitutes a portion of the housing. That is, at least that portion of the housing located on the optical path of the incident beam and the exit laser beam for the beam deflector 9 is embodied by the transparent member 7. In a top view of FIG. 2 facing the section produced by main scanning, the transparent member 7 lies at angle α with respect to the main-scanning direction on the photosensitive drum 11. Referring to FIG. 2, the angle α is said to be positive in a clockwise direction and negative in a counter-clockwise direction.

Figure 3:
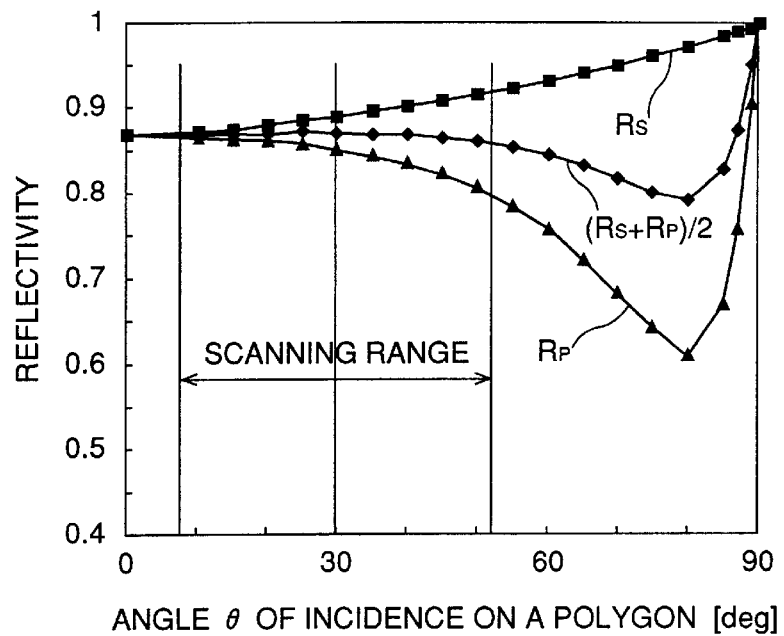
FIG. 3 is a graph showing a relationship between the reflectivity and an angle of incidence on a polygon.

In an optical write apparatus according to the related art, the beam incident on the deflecting and reflecting surface of the beam deflector 9 is configured to be S-polarized in order to properly shape a beam spot on the photosensitive drum 11. However, as indicated by the curve $R_s$ in FIG. 3, S-polarization of the incident beam causes a variation in the reflectivity in the scanning range, resulting in a relatively large variation in the beam intensity along the length of the photosensitive drum 11. In FIG. 3, the variation in the reflectivity caused by R-polarization of the incident beam is indicated by the curve $R_p$.

In order to reduce the variation in the reflectivity, the polarizer 5 is provided between the semiconductor laser 1 and the beam deflector 9 so as to polarize the beam to have a reflectivity characteristic $(R_s+R_p)/2$. That is, the beam is transformed into a circularly-polarized beam or a linearly-polarized beam having the plane of polarization rotated approximately −45° or +45° around the optical axis. As indicated by the curve $(R_s+R_p)/2$ in FIG. 3, the resultant beam has little variation in reflectivity in the scanning range so that a variation in beam intensity on the photosensitive drum 11 is reduced.

Figure 4:
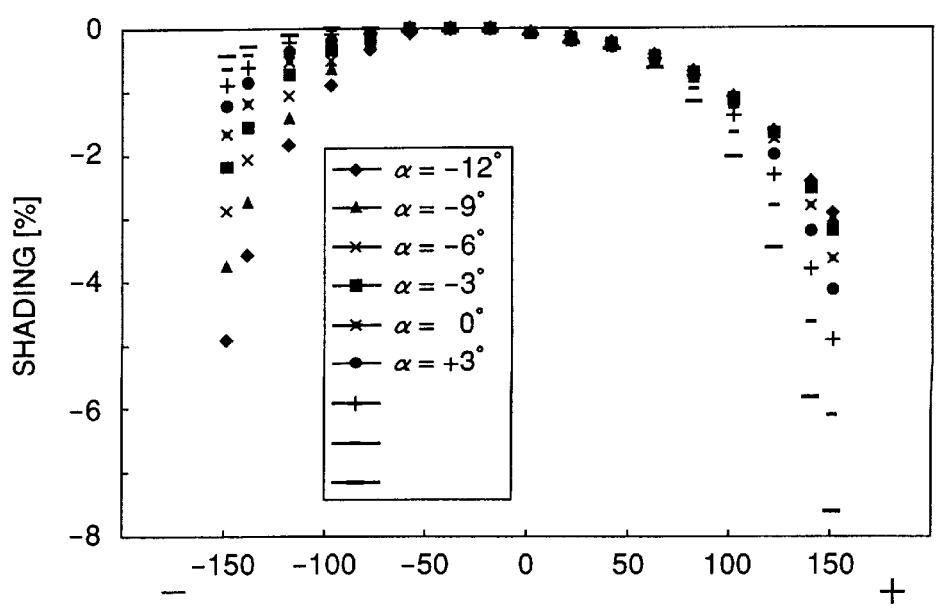
FIG. 4 is a graph showing shading characteristic.

FIG. 4 is a graph showing a variation in beam intensity on the photosensitive drum 11 depending on the angle α formed between the transparent member 7 and the main-scanning direction on the photosensitive drum 11. The relative level of beam intensity with respect to a desired level is customarily referred to as shading. Shading is largely determined by the light transmittivity characteristic of the transparent member 7, and is defined as $$(\eta/\eta max - 1) \times 100 [\%]$$

where η indicates transmittivity at each image height, and ηmax indicates maximum transmittivity in the scanning range. While the image height is in the positive range, shading characteristic deteriorates as the angle α of the transparent member 7 increases. As the angle α decreases, shading characteristic improves.

Figure 1C:
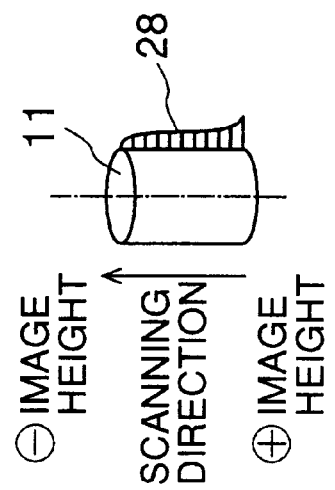
FIG. 1C shows uneven photosensitivity on the photosensitive drum.
Figure 1B:
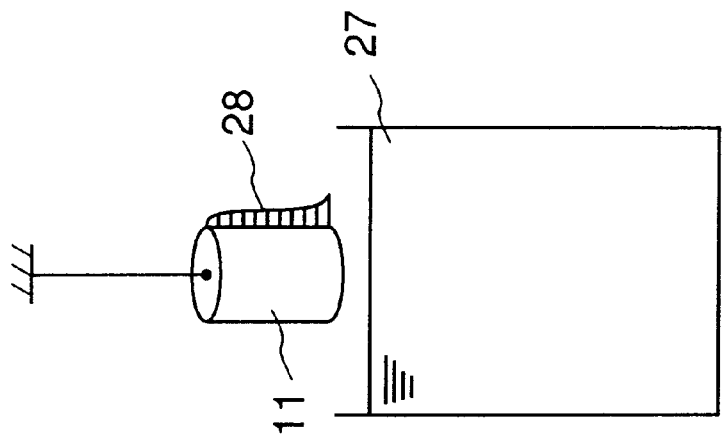
FIGS. 1A an 1B show how a photosensitive drum is produced.
Figure 1A:
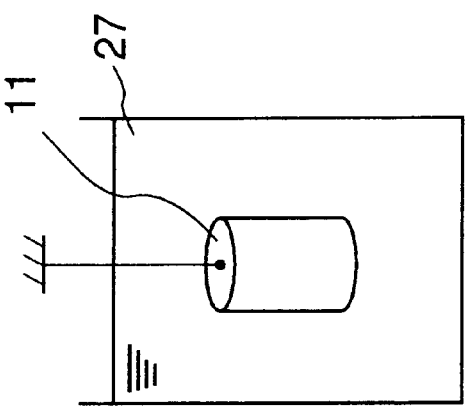

As described with reference to FIGS. 1A–1C, the photosensitive drum 11 may be uneven in photosensitivity as a result of a production process. In this case, the angle α of the transparent member 7 may be adjusted so that the unevenness of the photosensitivity on the photosensitive drum 11 and the unevenness of beam intensity on the photosensitive drum 11 cancel each other. In this way, charge is evenly built up on the photosensitive drum 11.

A qualitative explanation of the above arrangement will now be given. The transparent member 7 may be provided at an angle producing the shading characteristic shown in FIG. 5B in an optical write system including the photosensitive drum 11 having the photosensitivity distribution shown in FIG. 5A. In this example, it is assumed that the angle α=+6° of the transparent member 7 produces the best shading characteristic. In the positive image height range, the variation in the photosensitivity on the photosensitive drum 11 cancels shading. The amount of charge built up on the photosensitive drum 11 drops at the periphery of the negative image height range, as shown in FIG. 5C. However, this drop is negligibly small. Therefore, overall, the charge is built up evenly.

Figure 6:
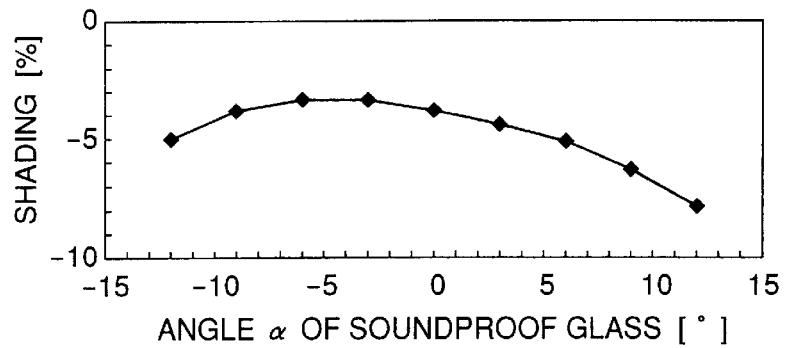
FIG. 6 is a graph showing the relationship between the angle of the transparent member and shading.

When it is assumed that the photosensitivity distribution is even on the photosensitive drum 11, it is preferable that the absolute value of shading is as small as possible in order to obtain a favorable image. FIG. 6 is a graph showing the relationship between the angle α and shading. Shading as represented in FIG. 6 is defined as (ηmin/ηmax−1)×100[%]

where ηmin indicates a minimum value of transmittivity η in the scanning range and ηmax indicates a maximum value of transmittivity η in the scanning range. FIGS. 4 and 6 reveal that even charge distribution results by setting the angle α (positive in a clockwise direction) to be within a range $-12° \leq \alpha \leq +9°$ so that the distribution of light intensity of the beam scanning the photosensitive drum 11 is even and symmetry with respect to the zero image height is ensured.

Figure 7:
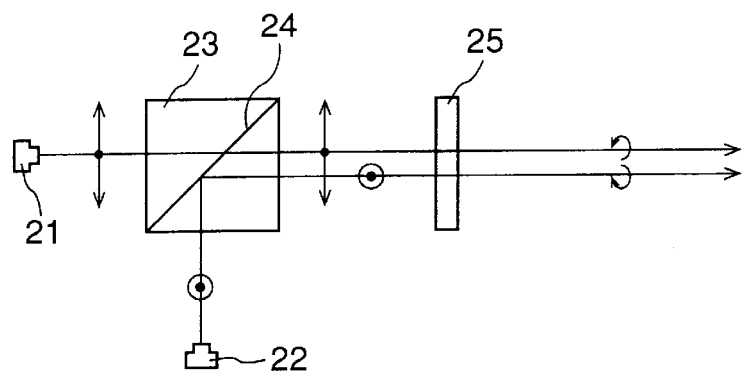
FIG. 7 shows a variation in the arrangement of seiconductor lasers.

A description will now be given, with reference to FIGS. 7 and 8, of a variation in an arrangement of semiconductor lasers applicable to the present invention. In this arrangement, two laser beams from two laser light sources are combined. Referring to FIG. 7, a first laser beam emitted by a first semiconductor laser 21 and a second laser beam emitted by a second semiconductor laser 22 are incident on a beam combination prism 23. The first laser beam passes through a polarizing beam splitter surface (PBS) 24 of the beam combination prism 23 and the second laser beam is reflected by the polarizing beam splitter surface 24 so that the first and second laser beams are combined before exiting an exit surface of the prism 23. The plane of linear polarization of the first laser beam and that of the second laser beam are at right angles to each other. By passing through a quarter-wave plate 25 provided in the exit path, the two laser beams are transformed into beams circularly polarized in opposite directions. The two laser beams thus combined are deflected by a beam deflector as shown in FIG. 2 and pass through a scanning optic such as an fθ lens so as to scan a photosensitive drum.

Figure 8:
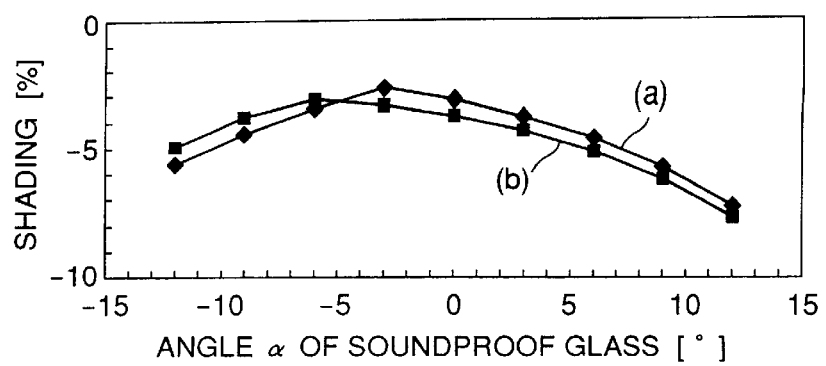
FIG. 8 is a graph showing shading occurring when the arrangement as shown in FIG. 7 is employed.

FIG. 8 is a graph showing shading defined as (ηmin/ηmax−1)×100[%] and occurring when the arrangement as shown in FIG. 7 is employed. The curve (a) in FIG. 8 indicates shading of the first laser beam and the curve (b) indicates shading of the second laser beam. It will be appreciated from FIG. 8 that the angle α=(−6°)–(0°) provides the best shading characteristic.

As has been described, using FIGS. 4, 6 and 8, by setting the angle α of the transparent member 7 to be in a general range of (−12°)–(+9°) and preferably in a range of (−6°)–(0°), shading is controlled to be below 6% so that an even image density on the photosensitive drum 11 can be obtained.

The present invention is not limited to the above-described embodiments, and variations and modifications may be made without departing from the scope of the present invention.

What is claimed is:

1. An optical write apparatus for evenly building up charge on a scanned surface comprising:

light source means for emitting a laser beam for scanning;

first image-forming means for converging the laser beam emitted by said light source means;

beam deflector means for deflecting the laser beam converged by said first image-forming means;

light transmitting means for varying a beam intensity and transmitting the laser beam incident on and exiting from said beam deflector means with a varied beam intensity and for muffling noise from said beam deflector means;

second image-forming means for producing a beam spot for scanning; and photosensitive means having a scanned surface thereof scanned by the beam spot produced by said second image-forming means and having a photosensitivity distribution, wherein said light transmitting means is provided at a predetermined angle α with respect to a main-scanning direction on the scanned surface to provide the varied beam intensity to compensate for the photosensitivity distribution of the photosensitive means so that charge is built up evenly on the scanned surface.

2. The optical write apparatus as claimed in claim 1, wherein said light source means is provided at one of angles +45° and −45° with respect to a plane swept by the laser beam in the main-scanning direction.

3. The optical write apparatus as claimed in claim 1, further comprising polarizer means for transforming the laser beam emitted by said light source means into a beam having a plane of linear polarization rotated approximately one of −45° and +45° around an optical axis.

4. The optical write apparatus as claimed in claim 1, further comprising polarizer means for transforming the laser beam emitted by said light source means into a circularly-polarized beam.

5. The optical write apparatus as claimed in claim 1, wherein said predetermined angle α is set such that $-12° \leq \alpha \leq +9°$, α having a positive value when measured clockwise in a top view facing the plane swept by the laser beam in the main-scanning direction.

6. The optical write apparatus as claimed in claim 1, wherein said light transmitting means forms a portion of a housing member accommodating said beam deflector means so as to be located on an incident optical path and an exit optical path of the laser beam deflected by said beam deflector means.

7. An optical write apparatus for evenly building up charge on a scanned surface comprising:

light source means for emitting a laser beam for scanning;

first image-forming means for converging the laser beam emitted by said light source means;

beam deflector means for deflecting the laser beam converged by said first-image forming means;

light transmitting means for varying a beam intensity and transmitting the laser beam incident on and exiting from said beam deflector means with a varied beam intensity and for muffling noise from said beam deflector means;

second image-forming means for producing a beam spot for scanning; and photosensitive means having a scanned surface thereof scanned by the beam spot produced by said second image-forming means, and having an even photosensitivity distribution, wherein said light transmitting means is provided at a predetermined angle α with respect to a main-scanning direction on the scanned surface so that the varied beam intensity, occurring as a result of the laser beam passing through said light transmitting means, is minimized, thus causing charge to be built up evenly on the scanned surface.

8. The optical write apparatus as claimed in claim 7, wherein said light source means is provided at one of angles +45° and −45° with respect to a plane swept by the laser beam in the main-scanning direction.

9. The optical write apparatus as claimed in claim 7, further comprising polarizer means for transforming the laser beam emitted by said light source means into a beam having a plane of linear polarization rotated approximately one of −45° and +45° around an optical axis.

10. The optical write apparatus as claimed in claim 7, further comprising polarizer means for transforming the laser beam emitted by said light source means into a circularly-polarized beam.

11. The optical write apparatus as claimed in claim 7, wherein said predetermined angle $\alpha$ is set such that $-12° \leq \alpha \leq +9°$, $\alpha$ having a positive value when measured clockwise in a top view facing the plane swept by the laser beam in the main-scanning direction.

12. The optical write apparatus as claimed in claim 7, wherein said light transmitting means forms a portion of a housing member accommodating said beam deflector means so as to be located on an incident optical path and an exit optical path of the laser beam deflected by said beam deflector means.

13. An optical write apparatus for evenly building up charge on a scanned surface comprising:

light source means for emitting a laser beam for scanning;

first image-forming means for converging the laser beam emitted by said light source means;

beam deflector means for deflecting the laser beam converged by said first image-forming means;

light transmitting means for varying a beam intensity and transmitting the laser beam incident on and exiting from said beam deflector means with a varied beam intensity and for muffling noise from said beam deflector means;

second image-forming means for producing a beam spot for scanning; and photosensitive means having a scanned surface thereof scanned by the beam spot produced by said second image-forming means, and having an uneven photosensitivity distribution, wherein said light transmitting means is provided at a predetermined angle $\alpha$ with respect to a main-scanning direction on the scanned surface so that the varied beam intensity, occurring as a result of the laser beam passing through said light transmitting means, cancels the uneven photosensitivity distribution on the photosensitive means, thus causing charge to be built up evenly on the scanned surface.

14. The optical write apparatus as claimed in claim 13, wherein said light source means is provided at one of angles +45° and −45° with respect to a plane swept by the laser beam in the main-scanning direction.

15. The optical write apparatus as claimed in claim 13, further comprising polarizer means for transforming the laser beam emitted by said light source means into a beam having a plane of linear polarization rotated approximately one of −45° and +45° around an optical axis.

16. The optical write apparatus as claimed in claim 13, further comprising polarizer means for transforming the laser beam emitted by said light source means into a circularly-polarized beam.

17. The optical write apparatus as claimed in claim 13, wherein said predetermined angle $\alpha$ is set such that $-12° \leq \alpha \leq +9°$, $\alpha$ having a positive value when measured clockwise in a top view facing the plane swept by the laser beam in the main-scanning direction.

18. The optical write apparatus as claimed in claim 13, wherein said light transmitting means forms a portion of a housing member accommodating said beam deflector means so as to be located on an incident optical path and an exit optical path of the laser beam deflected by said beam deflector means.

19. An optical write apparatus for evenly building up charge on a scanned surface comprising:

a light source unit for emitting a laser beam for scanning;

a first image-forming optic for converging the laser beam emitted by said light source unit;

a beam deflector for deflecting the laser beam converged by said first image-forming optic;

a transparent plate for varying a beam intensity and transmitting the laser beam incident on and exiting from said beam deflector with a varied beam intensity and for muffling noise from said beam deflector;

a second image-forming optic for producing a beam spot for scanning; and a photosensitive body having a scanned surface thereof scanned by the beam spot produced by said second image-forming optic and having a photosensitivity distribution, wherein said transparent plate is provided at a predetermined angle $\alpha$ with respect to a main-scanning direction on the scanned surface to provide the varied beam intensity to compensate for the photosensitivity distribution of the photosensitive means so that charge is built up evenly on the scanned surface.

20. The optical write apparatus as claimed in claim 19, wherein said light source unit is provided at one of angles +45° and −45° with respect to a plane swept by the laser beam in the main-scanning direction.

21. The optical write apparatus as claimed in claim 19, further comprising a polarizer unit for transforming the laser beam emitted by said light source unit into a beam having a plane of linear polarization rotated approximately one of −45° and +45° around an optical axis.

22. The optical write apparatus as claimed in claim 19, further comprising a polarizer unit for transforming the laser beam emitted by said light source unit into a circularly-polarized beam.

23. The optical write apparatus as claimed in claim 19, wherein said predetermined angle $\alpha$ is set such that $-12° \leq \alpha \leq +9°$, $\alpha$ having a positive value when measured clockwise in a top view facing the plane swept by the laser beam in the main-scanning direction.

24. The optical write apparatus as claimed in claim 19, wherein said transparent plate forms a portion of a housing member accommodating said beam deflector so as to be located on an incident optical path and an exit optical path of the laser beam deflected by said beam deflector.

25. An optical write apparatus for evenly building up charge on a scanned surface comprising:

a light source unit for emitting a laser beam for scanning;

a first image-forming optic for converging the laser beam emitted by said light source unit;

a beam deflector for deflecting the laser beam converged by said first image-forming optic;

a transparent plate for varying a beam intensity and transmitting the laser beam incident on and exiting from said beam deflector with a varied beam intensity and for muffling noise from said beam deflector;

a second image-forming optic for producing a beam spot for scanning; and a photosensitive body having a scanned surface thereof scanned by the beam spot produced by said second image-forming optic, and having an even photosensitivity distribution, wherein said transparent plate is provided at a predetermined angle $\alpha$ with respect to a main-scanning direction on the scanned surface so that the varied beam intensity, occurring as a result of the laser beam passing through said transparent plate, is minimized, thus causing charge to be built up evenly on the scanned surface.

26. The optical write apparatus as claimed in claim 25, wherein said light source unit is provided at one of angles +45° and −45° with respect to a plane swept by the laser beam in the main-scanning direction.

27. The optical write apparatus as claimed in claim 25, further comprising a polarizer unit for transforming the laser beam emitted by said light source unit into a beam having a plane of linear polarization rotated approximately one of −45° and +45° around an optical axis.

28. The optical write apparatus as claimed in claim 25, further comprising a polarizer unit for transforming the laser beam emitted by said light source means into a circularly-polarized beam.

29. The optical write apparatus as claimed in claim 25, wherein said predetermined angle $\alpha$ is set such that $-12° \leq \alpha \leq +9°$, $\alpha$ having a positive value when measured clockwise in a top view facing the plane swept by the laser beam in the main-scanning direction.

30. The optical write apparatus as claimed in claim 25, wherein said transparent plate forms a portion of a housing member accommodating said beam deflector so as to be located on an incident optical path and an exit optical path of the laser beam deflected by said beam deflector.

31. An optical write apparatus for evenly building up charge on a scanned surface comprising:
    a light source unit for emitting a laser beam for scanning;
    a first image-forming optic for converging the laser beam emitted by said light source unit;
    a beam deflector for deflecting the laser beam converged by said first image-forming optic;
    a transparent plate for varying a beam intensity and transmitting the laser beam incident on and exiting from said beam deflector with a varied beam intensity and for muffling noise from said beam deflector;
    a second image-forming optic for producing a beam spot for scanning; and
    a photosensitive body having a scanned surface thereof scanned by the beam spot produced by said second image-forming optic, and having an uneven photosensitivity distribution,
    wherein said transparent plate is provided at a predetermined angle $\alpha$ with respect to a main-scanning direction on the scanned surface so that the varied beam intensity, occurring as a result of the laser beam passing through said transparent plate, cancels the uneven photosensitivity distribution on the photosensitive body, thus causing charge to be built up evenly on the scanned surface.

32. The optical write apparatus as claimed in claim 31, wherein said light source unit is provided at one of angles +45° and −45° with respect to a plane swept by the laser beam in the main-scanning direction.

33. The optical write apparatus as claimed in claim 31, further comprising a polarizer unit for transforming the laser beam emitted by said light source unit into a beam having a plane of linear polarization rotated approximately one of −45° and +45° around an optical axis.

34. The optical write apparatus as claimed in claim 31, further comprising a polarizer unit for transforming the laser beam emitted by said light source unit into a circularly-polarized beam.

35. The optical write apparatus as claimed in claim 32, wherein said predetermined angle $\alpha$ is set such that $-12° \leq \alpha \leq +9°$, $\alpha$ having a positive value when measured clockwise in a top view facing the plane swept by the laser beam in the main-scanning direction.

36. The optical write apparatus as claimed in claim 31, wherein said transparent plate forms a portion of a housing member accommodating said beam deflector so as to be located on an incident optical path and an exit optical path of the laser beam deflected by said beam deflector.

* * * * *